United States Patent
Fujishiro et al.

(10) Patent No.: US 9,097,822 B2
(45) Date of Patent: Aug. 4, 2015

(54) LENTICULAR LENS SHEET AND PROCESS FOR PRODUCTION THEREOF, AND OPTICAL ELEMENT

(75) Inventors: Koichi Fujishiro, Kisarazu (JP); Toshihide Itahara, Kisarazu (JP); Tohru Saito, Kisarazu (JP); Takahiro Yoshioka, Kisarazu (JP); Shinsuke Iguchi, Chigasaki (JP); Kentaro Kumita, Sammu (JP); Tomoharu Takita, Sammu (JP)

(73) Assignee: NIPPON STEEL & SUMIKIN CHEMICAL CO., LTD., Tokyo (JP)

( * ) Notice: Subject to any disclaimer, the term of this patent is extended or adjusted under 35 U.S.C. 154(b) by 247 days.

(21) Appl. No.: 13/701,905

(22) PCT Filed: Jun. 3, 2011

(86) PCT No.: PCT/JP2011/062811
§ 371 (c)(1),
(2), (4) Date: Dec. 4, 2012

(87) PCT Pub. No.: WO2011/155409
PCT Pub. Date: Dec. 15, 2011

(65) Prior Publication Data
US 2013/0094080 A1     Apr. 18, 2013

(30) Foreign Application Priority Data
Jun. 7, 2010   (JP) ................. 2010-130006

(51) Int. Cl.
*G02B 27/22* (2006.01)
*G02B 3/00* (2006.01)

(52) U.S. Cl.
CPC .......... *G02B 3/0012* (2013.01); *G02B 27/2214* (2013.01)

(58) Field of Classification Search
None
See application file for complete search history.

(56) References Cited

U.S. PATENT DOCUMENTS

| 6,839,178 B2 | 1/2005 | Uchiyama et al. |
| 7,108,415 B2 | 9/2006 | Hayakawa |
| 2010/0247757 A1* | 9/2010 | Inoue ............... 427/162 |

FOREIGN PATENT DOCUMENTS

| JP | 6-65408 A | 3/1994 |
| JP | 7-66155 B2 | 7/1995 |
| JP | 9-114024 A | 5/1997 |
| JP | 11-281815 A | 10/1999 |
| JP | 2000-155380 A | 6/2000 |

(Continued)

OTHER PUBLICATIONS

International Search Report for the Application No. PCT/JP2011/062811 mailed Jul. 26, 2011.

(Continued)

*Primary Examiner* — Jade R Chwasz
(74) *Attorney, Agent, or Firm* — Cheng Law Group, PLLC

(57) ABSTRACT

Provided are a lenticular lens sheet which can be used in a stereoscopic display, a rear projection display, a projection screen, and the like, and means for manufacturing the lenticular lens sheet at low cost without using any mold. The lenticular lens sheet includes at least a transparent support substrate; a plurality of lenticular lenses; and a partition between adjacent ones of the plurality of lenticular lenses, and the lenticular lens sheet is obtained by applying a transparent resin composition ink by an inkjet method to an area partitioned by the partition and subsequently curing the transparent resin composition ink with ultraviolet rays.

12 Claims, 7 Drawing Sheets

(a) TYPICAL LENTICULAR LENS (b) LENTICULAR LENS ACCORDING TO THE PRESENT INVENTION

(56) References Cited

FOREIGN PATENT DOCUMENTS

| | | |
|---|---|---|
| JP | 2002-355826 A | 12/2002 |
| JP | 2002-365405 A | 12/2002 |
| JP | 2004-20684 A | 1/2004 |
| JP | 2005-249882 A | 9/2005 |
| JP | 2008-224825 A | 9/2008 |
| JP | 2008-242314 | 10/2008 |
| WO | WO-02/03136 A1 | 1/2002 |

OTHER PUBLICATIONS

International Preliminary Report on Patentability for Application No. PCT/JP2011/062811 mailed Jan. 17, 2013.

* cited by examiner (a) TYPICAL LENTICULAR LENS (b) LENTICULAR LENS ACCORDING TO THE PRESENT INVENTION CROSS-SECTIONAL VIEW OF LENTICULAR LENS:
(a) LENS PORTION $$\tan\left(\frac{\theta o}{2}\right) = \frac{C}{\left(\frac{B}{2}\right)} = \frac{ho}{\left(\frac{wo}{2}\right)}$$

CROSS-SECTIONAL VIEW OF LENTICULAR LENS:
(b) PARTITION PORTION

METHOD OF FORMING LENS ($h_0 < h$, $\theta_0 < \theta$)

RELATIONSHIP OF TARGET FILLING AMOUNT VOLUME
WITH RESPECT TO TARGET HEIGHT h (PITCH 320 μm)

STATIC CONTACT ANGLE BETWEEN PARTITION FILM
SURFACE AND ULTRAVIOLET CURABLE RESIN FOR LENS
MEASURED IN 1 SECOND AFTER DROPPING 0.5 µl (AT 23°C)

(a)

(b)

LENTICULAR LENS SHEET AND PROCESS FOR PRODUCTION THEREOF, AND OPTICAL ELEMENT

TECHNICAL FIELD

The present invention relates to a lenticular lens sheet formed by using an inkjet printing method and a method of manufacturing the lenticular lens sheet, and further relates to an optical element formed by using the lenticular lens sheet and a stereoscopic display.

BACKGROUND ART

Lenticular lens sheets are elements to be used in a backlight unit of a liquid crystal display, a rear-projection display, a projection screen, a stereoscopic display, and the like. In general, a concave lens is formed like a stripe on a surface of a transparent substrate such as glass or a plastic sheet.

In particular, a three-dimensional display is known as one of the display systems which have attracted attention as next-generation display systems. Among modes of the three-dimensional display, as one which does not require any special glasses, a lenticular mode is typically given (see Non Patent Literature 1). Various three-dimensional displays of such mode in combination with a flat panel display such as a liquid crystal display (LCD) have recently been proposed, and thus the mode is considered to be closest to a practical level. However, in the conventional lenticular mode, an image resolution depends on a pitch of a lens or a barrier. Hence, a lens having a higher definition is required for realizing a display having a higher resolution. Further, it is necessary to position a lens and a barrier accurately with respect to a flat panel display.

Meanwhile, a three-dimensional display using a field-sequential light direction control back light has recently been proposed as a novel mode of the three-dimensional display (see Patent Literature 1). A principle of this mode involves adopting, as a back light of a display, a field-sequential light direction control back light 1 which can change a direction of light (LD) from the back light sequentially at high speed, and displaying an image depending on the direction of the light on a transmission display 2. Through utilization of this mode, binocular parallax images are provided in directions of left and right eyes LE and RE, and the directions are switched at blinding speed, thereby being able to provide a three-dimensional image to an observer. Further, an image resolution of this mode is the same as that of an LCD, and hence a high resolution of the LCD can be directly utilized, which facilitates manufacture and an increase in resolution.

In general, the lenticular lens has a spherical surface profile, and the following methods are known as processing means therefor. That is, for example, there are given: (1) a method of subjecting a molten or semi-molten thermoplastic resin to injection molding; (2) a method of subjecting a sheet to embossing under heating (see Patent Literature 2); (3) a method of curing an ultraviolet curable resin in a template with ultraviolet light (see Patent Literature 3); and (4) a method of subjecting an ultraviolet curable resin to screen printing, and curing the ultraviolet curable resin with ultraviolet light (see Patent Literature 4). However, any of these manufacturing methods requires a mold having high processing accuracy or requires a printing plate. Further, the mold or the plate inevitably comes into contact with a lens surface, and hence a foreign matter is mixed into a lens, or a flaw in the mold easily affects the lens.

Meanwhile, as a method of manufacturing a color filter by using an inkjet method, there is known a pixel forming method of spraying and curing inks of red, blue, and green only on required pixels, respectively, in a simultaneous manner, in which a partition is formed in advance in a photolithography process and the ink is ejected on a pixel portion defined by the partition. In this method, in order to avoid blurring of each color area and color mixing between adjacent areas, for example, an example is disclosed in Patent Literature 5 in which the color mixing can be avoided so long as a static contact angle between the ink and the partition surface is 40° to 55°. A height of the ink filled by using the inkjet method at this time with respect to a height of the partition is as high as about 4 times to 6 times.

As means for providing the partition to achieve such an object, the following two methods have been proposed. That is, (1) a treatment of a surface layer of the partition by using a fluorine-containing plasma gas (see Patent Literature 6) and (2) a method of mixing a fluorine-based compound or a silicon-based compound in a composition of a photoresist as a component for providing ink-repellency (see Patent Literature 5).

However, as for the manufacture of the color filter by using the inkjet method, although a resolution and a precision at a liquid crystal display device (LCD) level has already been established so far, there has been no attempt to manufacture a lenticular lens by using the inkjet method to the best of the inventors' knowledge despite the fact that a formation of a spherical dot lens by using the inkjet method is observed in some examples.

CITATION LIST

Patent Literature

[PTL 1] JP 2004-20684 A
[PTL 2] JP 09-114024 A
[PTL 3] JP 2002-365405 A
[PTL 4] JP 2000-155380 A
[PTL 5] JP 11-281815 A
[PTL 6] JP 06-65408 A
[PTL 7] JP 2005-249882 A

Non Patent Literature

[NPL 1] Takanori Okoshi, "Three-dimensional imaging techniques," Asakura Publishing Co., Ltd. (1991)

SUMMARY OF INVENTION

Technical Problem

The present invention has been made in view of the conventional problems in the manufacture of the lenticular lens, and an object of the present invention is to solve problems that the conventional molding method, which uses a mold and a plate, has decreased a yield due to mixing of a foreign matter and a flaw in a mold or the like, failing to prevent a lens surface from being brought into contact, and has not been suitable for manufacturing inexpensive and various kinds of lenticular lenses due to a usage of an expensive mold.

Solution to Problem

The inventors of the present invention have recognized that formation of the lenticular lens by using the inkjet method is a non-contact printing method that does not need a mold and a plate, and completed the present invention from a finding that a sufficient resolution and precision up to LCD level can be achieved by combining formation of a partition with respect to a transparent support substrate that serves as a base by using a photolithography process.

That is, an outline of the present invention is as follows.

(1) A lenticular lens sheet, including: a support substrate; a plurality of lenticular lenses on the support substrate; and a partition between adjacent ones of the plurality of lenticular lenses, in which the lenticular lens sheet is obtained by supplying a transparent resin composition ink by an inkjet method to an area partitioned by the partition and subsequently curing the transparent resin composition ink with ultraviolet rays.

(2) A lenticular lens sheet according to Item (1), in which a cross section of the partition cut in a direction perpendicular to the plurality of lenticular lenses has a taper angle of 90° or smaller with respect to the support substrate, and the following condition is satisfied $$A \leq B \quad \text{(i)}$$

$$A \leq w_0/8 \quad \text{(ii)}$$

$$C < h_0/3 \quad \text{(iii)}$$

where A is upper base of the partition cross section, B is lower base of the partition cross section, C is height of the partition, $w_0$ is pitch of the lenticular lenses, and $h_0$ is height of the lenticular lenses.

(3) A lenticular lens sheet according to Item (1), in which the transparent resin composition ink forming the plurality of lenticular lenses includes an ultraviolet curable resin composition ink containing an ultraviolet curable component of 90 wt % or more and has a residual volume ratio of 70 vol % or more after a heat treatment at a temperature of 80° C. to 140° C.

(4) A method of manufacturing a lenticular lens sheet according to any one of Items (1) to (3), the method including: with respect to a pitch $w_0$ and a height $h_0$ of a target lenticular lens and an angle $\theta_0$ of the lenticular lens with respect to the support substrate, (1) forming the partition including a surface having ink-repellency with the same pitch as the pitch $w_0$ of the target lenticular lenses;

(2) applying, by the inkjet method, the transparent resin composition ink curable by ultraviolet rays with an amount V (pl/μm) exceeding a volume $V_0$ (pl/μm) required to form the lenticular lenses or with a height h exceeding the target height $h_0$ with respect to the area partitioned by the partition ($V_0$ is calculated from a volume of the target lenticular lens as follows, where r is curvature radius of the lens cross section.)

$$\theta_0 = 2 \times \tan^{-1}\left[\frac{h_0}{\left(\frac{w_0}{2}\right)}\right] \quad \text{(Equation 1)}$$

$$h(r) = \sqrt{\frac{\left(\frac{w_0}{2}\right)^2}{\sin^2\theta_0} - r^2} - \frac{\frac{w_0}{2}}{\tan\theta_0}$$

$$V_0 = \int_{-\frac{w_0}{2}}^{\frac{w_0}{2}} h(r)\,dr \; (pl/\mu m);$$

(3) curing the transparent resin composition ink by using the ultraviolet rays; and (4) obtaining the target height $h_0$ by performing a heat treatment at a temperature of 80° C. to 140° C.

(5) A method of manufacturing a lenticular lens sheet according to Item (4), in which a static contact angle $\theta_L$ of the transparent resin composition ink forming the lenticular lenses with respect to a surface of the partition exceeds $\theta_0$ represented by (Equation 1).

(6) An optical element, including the lenticular lens sheet according to any one of Items (1) to (3).

(7) A stereoscopic display, including the lenticular sheet according to any one of Items (1) to (3).

In the present invention, a general substrate used for a lenticular lens can be used as the transparent support substrate. Glass for a liquid crystal display as well as a transparent plastic sheet or film having a transmissivity of 90% or higher, such as acryl, PET, PC, and polyolefin, can be used.

A lenticular lens 2 partitioned by a partition 3 according to the present invention is illustrated in a schematic view of section (b) of FIG. 1, and a typical lenticular lens without the partition is illustrated in a schematic view of section (a) of FIG. 1 for comparison. A portion where the lenticular lenses are brought into contact with each other is an area that is not substantially used as a lens, and therefore, so long as a condition, which is described later, is satisfied, it does not matter whether the portion is transparent or black (for example, when the portion is to be black, a carbon particle is mixed). The portion where the lenticular lenses are brought into contact with each other is an area that is not substantially used as a lens, and therefore, the portion can also be formed as a black partition to absorb excess light.

The partition, which is a structural element of the present invention, has a cross-sectional shape cut in a direction orthogonal to a plurality of lenticular lenses and a size thereof that depend on a shape of a target lens. However, a successful result can be obtained in forming a spherical lens at least when it is forward tapered at an angle of 90° or smaller with respect to the support substrate (FIG. 7), and also in order to set a lens portion as a main component, it is at least set as follows (FIG. 2).

$$A \leq B$$

$$A \leq w_0/8$$

$$C < h_0/3$$

A: Upper base of partition trapezoidal cross section (μm)
B: Lower base of partition trapezoidal cross section (μm)
C: Height of partition (μm)

When the upper base width A of the partition exceeds $w_0/8$ or when the height C is equal to or higher than $h_0/3$, an influence of the partition portion on a lens portion image becomes conspicuous, and a three-dimensional image is blurred, which is not preferred. Here, $w_0$ is a repeated pitch of the lenticular lenses, i.e., $w_0$=width of lenticular lens+width of partition.

In formation of the partition having surface ink-repellency, a known negative alkali-developable photosensitive resin ink can be used. This ink is manufactured by dissolving a typical alkali-developable binder resin, a polyfunctional acrylate, and a photoinitiator in a solvent.

This negative alkali-developable photosensitive resin ink is applied on the transparent support substrate by using a spin coater or a slit coater, the support substrate is then irradiated with light of 50 mJ/cm² to 300 mJ/cm² from a high-pressure mercury lamp via a photomask, a non-exposed portion is removed by a surfactant-containing alkali developer, and a partition pattern is formed by cleaning the support substrate with water. This pattern is subjected to heat treatment at 80° C. to 230° C. considering adhesiveness with respect to the substrate and stability when being used. Means for providing the ink-repellency to the partition surface includes a method of performing a treatment of a surface layer of the partition by using a fluorine-containing plasma gas (see Patent Literature 6) and a method of mixing in advance a fluorine-based compound or a silicon-based compound in an ink as a composition of a photoresist and as a component for providing the ink-repellency (see Patent Literature 5).

As a transparent resin composition ink that is filled between the partitions by the inkjet method and cured by ultraviolet rays, it is preferred to use an ink containing a photoinitiator in a main component of a liquid-phase polyfunctional acrylate. The ink is prepared to have a viscosity of 5 mP·sec to 40 mP·sec and a surface tension of 20 mN/m to 35 mN/m at a head temperature of 20° C. to 45° C. such that the ink can be sprayed in a stable manner by the inkjet method. In addition, in order to maintain a spherical shape with good reproducibility, it is preferred that the ink contain an ultraviolet curable resin component of 90 wt % or more. In particular, it is not preferred that a component that is volatilized before UV curing exceed 10% because the spherical shape and the height suitable for the lenticular lens are not stabilized within a sheet plane. Further, because the volume is shrunk by the UV curing or a heat treatment following the UV curing, in order to achieve a target height and a target lens shape, it is preferred that the substrate be irradiated with ultraviolet rays such that a residual volume ratio is 70 vol % or more, and more preferably, 75 vol % or more. When the residual volume ratio is lower than 70 vol %, a fluctuation within the plane of the lenticular lens sheet may become conspicuous or a wrinkle may be generated on the surface. Moreover, the lens shape becomes closer to a planar surface from a spherical surface at a top portion, causing a discrepancy of a focal distance within the lens.

When a heat treatment of 80° C. to 140° C. is applied after the UV curing, durability is achieved, which is suitable for the lenticular lens sheet. Only with an optical radical polymerization, in the ultraviolet curable resin composite, virtually no reaction of double bonding is completed, so that an unreacted acrylic monomer often remains. In addition, a residual stress remains due to a shrinkage caused by the optical curing, which causes a phenomenon that the lens characteristic and the adhesiveness are changed with time. By reducing the residual monomer and the residual stress by the heat treatment, the durability of the lens characteristic is improved. These manufacturing steps are schematically illustrated in FIG. 3.

Although the amount of the transparent curing resin ink to be filled between the partitions by the inkjet method is determined by considering a volume shrinkage due to the following UV curing and the heat treatment, in order to obtain at least the lenticular lens having a shape illustrated in section (a) of FIG. 1, the ink is filled with a volume amount exceeding a volume per unit length $V_0$ (pl/μm) in a longitudinal direction of the lens. $V_0$ is calculated from a volume of a target lenticular lens, as represented by the following (Equation 1).

$$\theta_0 = 2 \times \tan^{-1}\left[\frac{h_0}{\left(\frac{w_0}{2}\right)}\right]$$ (Equation 1)

$$h(r) = \sqrt{\frac{\left(\frac{w_0}{2}\right)^2}{\sin^2\theta_0} - r^2} - \frac{\frac{w_0}{2}}{\tan\theta_0}$$

$$V_0 = \int_{-\frac{w_0}{2}}^{\frac{w_0}{2}} h(r)dr \ (pl/\mu m)$$

For example, when the partition pitch is set to a target lens pitch of 320 μm, a volume V equal to or larger than $V_0$ (pl/ml) obtained from (Equation 1) is required to obtain a target lens height h0 (μm) (a calculation example of $V_0$ is shown in FIG. 4).

When curing the transparent resin composition ink filled between the partitions, optical curing by using ultraviolet rays is suitable. A known exposing method can be used. It is preferred to perform pre-exposure on an inkjet (IJ) stage before conveying the substrate to an exposure machine ((2') of FIG. 3). The lens before the optical curing is in a liquid phase, so that the reason for performing the pre-exposure is to prevent a coalition between the lenses and to eliminate a concern of a foreign matter attaching to the lens while being conveyed. As a line exposure machine used for this purpose, a compact high-illuminance exposure machine using a UV-LED lamp has recently been commercially available (for example, from OMRON CORPORATION and NICHIA CORPORATION). Although it is preferred that a required exposure amount be 1,000 mJ/cm² or larger, because the required exposure amount depends on the transparent curing resin composition ink and exposure machine illuminance/output wavelength, it is generally preferred to use an exposure amount with less dependency on the residual volume ratio or larger.

The heat treatment after the optical curing is selected based on a degree of reliability. For example, when a stability of the lens performance at the time of a constant temperature test is considered, the heat treatment is performed at the test temperature, for example, at 80° C.

As for a degree of providing ink-repellent performance of the surface, it is required that a static contact angle $\theta_L$ between the partition surface (film surface) and the ultraviolet curable resin ink for forming the lens (FIG. 5) be larger than an angle $\theta_0$ between the target lenticular lens and the substrate. Preferably, it is expressed by $$\tan(\theta L) > 1.3 \times \tan(\theta_0)$$ (Equation 2)

A droplet sprayed from the inkjet is spotted on the substrate at a high speed, and then tries to climb over the partition by its kinetic energy. A contact angle between the liquid and the partition surface at that time is a dynamic angle of advance. However, normally, it often becomes virtually equal to the static contact angle. After that, the movement of the filled droplet becomes settled, and the angle becomes a contact angle corresponding to a filling volume.

With the above-mentioned manufacturing condition, a preferable lenticular lens sheet is manufactured.

Advantageous Effects of Invention

According to the present invention, a lenticular lens sheet used for a three-dimensional display and the like can be manufactured at low cost, and because the lenticular lens sheet can be obtained without using a mold and a plate that are used in the conventional method, there is no possibility of decreasing the yield due to mixing of a foreign matter, a flaw in a mold, and the like, and further, the present invention is suitable for obtaining various types of lenticular lens sheets.

DESCRIPTION OF EMBODIMENTS

Figures 1A, 1B:
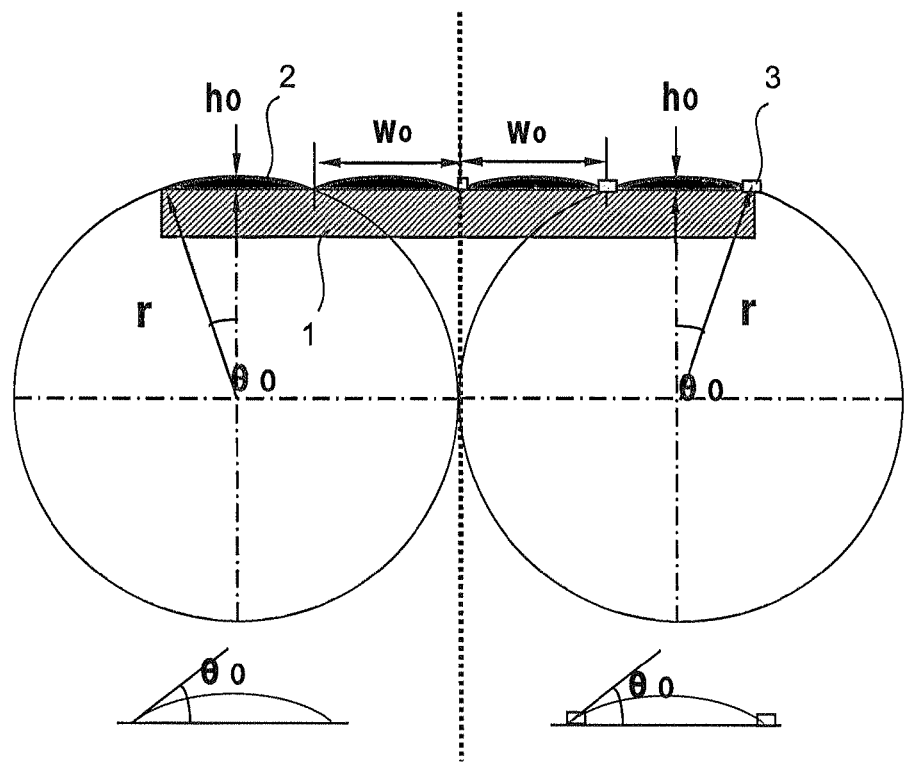
FIG. 1 is a schematic cross-sectional view illustrating a profile of a lenticular lens formed on a transparent support substrate.

Next, the present invention is described in detail by way of examples. Note that, each of the terms "part(s)" in the following description means "part(s) by mass."

EXAMPLES

Preparation of Ultraviolet Curable Resin Ink (A1) for Transparent Partition

A homogeneous and transparent ink was obtained by mixing 205 parts of alkali-developable photocurable resin V-259ME (manufactured by NIPPON STEEL CHEMICAL CO., LTD., solid content 56.5%, a propylene glycol methyl ether acetate solvent), 50 parts of a mixture of dipentaerythritol hexaacrylate and dipentaerythritol pentaacrylate (manufactured by NIPPON KAYAKU CO., LTD.: KAYARAD DPHA), 25 parts of biphenyl epoxy resin (manufactured by JAPAN EPDXY RESIN CO., LTD. YX4000HK), 5 parts of Irgacure 907 (manufactured by CHIBA JAPAN CO., LTD.), 0.8 parts of 4,4'-N,N-diethyl-4,4'-diphenyl EAB-F (manufactured by HODOGAYA CHEMICAL CO., LTD.), 1.9 parts of a silane coupling agent S-510 (manufactured by CHISSO CORPORATION), 0.2 parts of a fluorine-based surfactant FC470 (manufactured by DIC CORPORATION), and 608 parts of diethylene glycol dimethyl ether. The obtained ink was filtered through a 0.2-μm microfilter, thus preparing the ultraviolet curable resin ink A1 for the transparent partition (solid content concentration 22 wt %).

Preparation of Ultraviolet Curable Resin Ink (Surface Ink-Repellency: A2) for Transparent Partition An ultraviolet curable resin ink A2 for a transparent partition was prepared by adding 5 parts of a fluorine compound solution OPTOOL (manufactured by DAIKIN INDUSTRIES LTD., fluorine compound solid content 20%) with respect to 100 parts of the ultraviolet curable resin ink A1 for the transparent partition.

Preparation of Ultraviolet Curable Resin Ink (B1)

15 parts of phenylethyl methacrylate-terminated polydivinylbenzene (PDV) (manufactured by NIPPON STEEL CHEMICAL CO., LTD.), 5 parts of trimethylolpropane triacrylate, 10 parts of 2-hydroxyethyl acrylate, 50 parts of 1,4-butanediol diacrylate, 20 parts of 1,9-nonanediol diacrylate, 7 parts of Irgacure 184 (manufactured by Ciba Specialty Chemicals Inc.), 0.05 part of ADK STAB AO-60 (manufactured by ADEKA CORPORATION), and 1.1 parts of a diethylene glycol monoethyl ether acetate solution containing 10% of a surfactant BYK 378 (manufactured by BYK-Chemie Japan K. K.) were mixed to form a homogeneous solution. The solution was filtered through a 0.2-μm microfilter to prepare an ultraviolet curable resin ink B1. The ink had a viscosity of 19.9 mPa·sec, a surface tension of 25.1 mN/m, and a density of 1,055 kg/m³.

Example 1

Creation of Surface Ink-Repellent Transparent Partition (I-A2-1)

The ultraviolet curable resin ink (A1) for the transparent partition was uniformly applied on a 6-inch-square alkali-free glass substrate (thickness 0.7 mm), and then dried for 1 minute on a hot plate of 80° C. The substrate was exposed at 300 mJ with a one-shot ultraviolet exposure machine (illuminance: I beam standard 30 mW/cm²) via a photomask-1, developed for 60 seconds in a 0.05% KOH water solution (23° C.) with a spray pressure of 1 kg/cm² to remove an unexposed portion, and then cleaned with a pure water. Further, the substrate was heated in an oven for 30 minutes at 230° C., thereby creating a transparent partition substrate (I-A2-1) having a thickness of 2 μm.

Figure 2A:
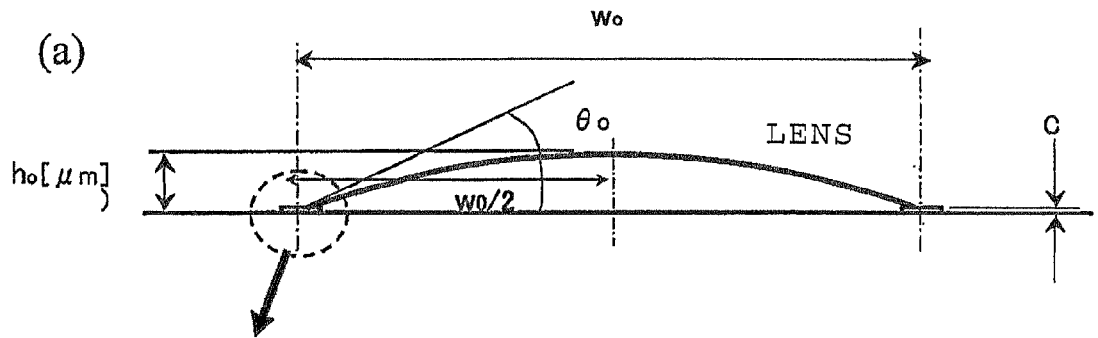
FIG. 2 is an enlarged schematic cross-sectional view of portions of a partition and the lenticular lens.
Figure 2B:
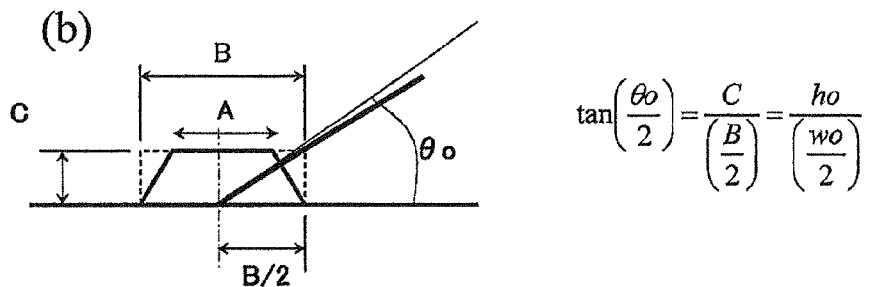
Figure 3:
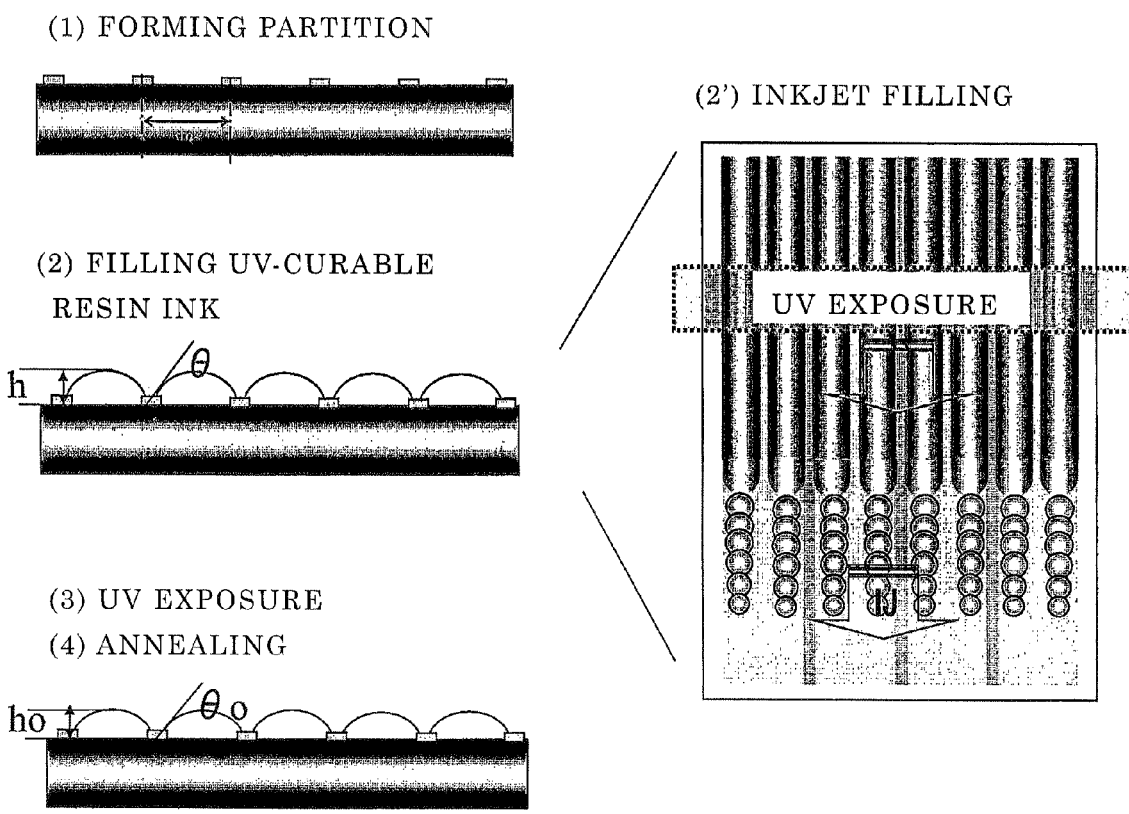
FIG. 3 is a schematic diagram illustrating a process of manufacturing a lenticular lens sheet.
Figure 4:
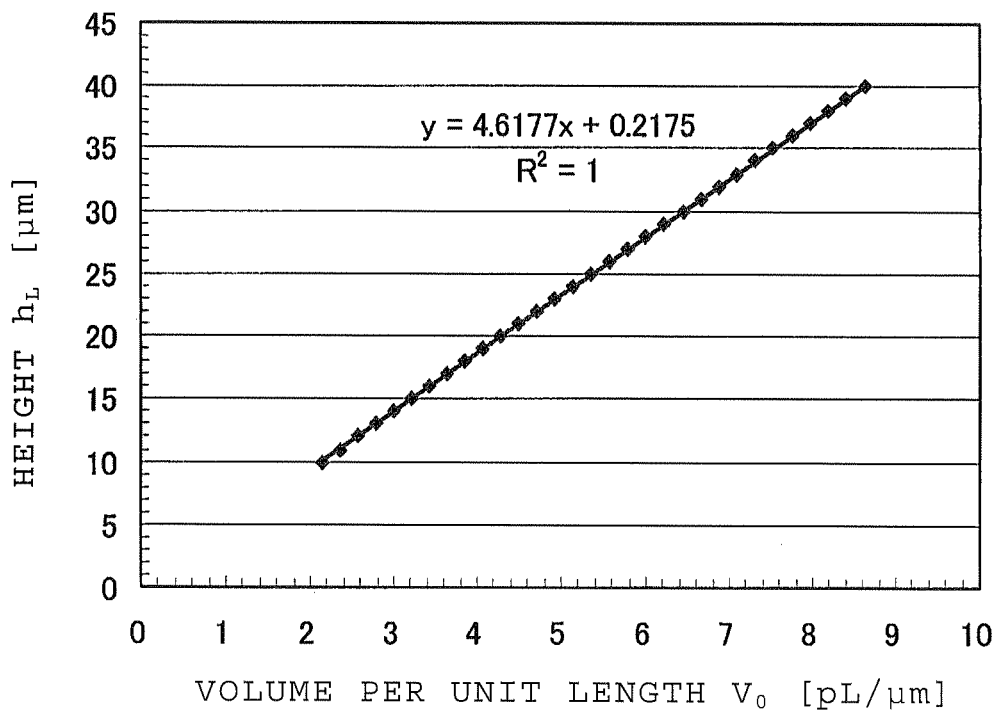
FIG. 4 is a graph showing a calculation example of a volume $V_0$ (pl/μm) required to form the lenticular lens.

The photomask-1 is used to form an exposed portion having a line pattern of a width of 20 μm and a length of 30 mm with a pitch of 320 μm. A shape of the 20-μm line (partition) on the obtained substrate I-A2-1 is a trapezoidal shape (FIG. 2), and a size measured by a SURFCOM (manufactured by TOKYO SEIMITSU CO., LTD.) is shown in Table 1.

TABLE 1

| | | | Partition size (Trapezoidal cross section) | | | |
|---|---|---|---|---|---|---|
| Example | Substrate name | Mask width | Upper base A (μm) | Lower base B (μm) | Film Thickness C (μm) | Taper angle (Degree) |
| 1 | I-A2-1 | 20 | 18.0 | 22.0 | 2.0 | 46.0 |
| 2 | I-A2-2 | 30 | 27.5 | 32.4 | 2.0 | 46.0 |
| 3 | I-A2-3 | 40 | 38.5 | 42.0 | 2.0 | 46.0 |

Figure 5:
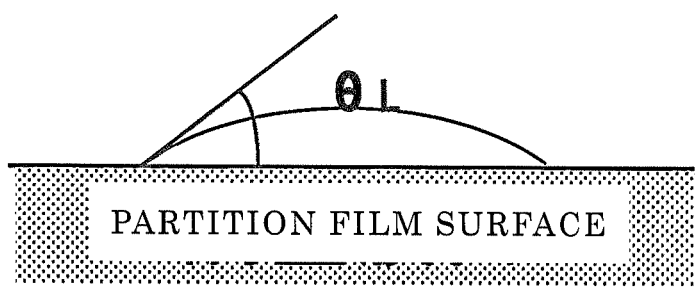
FIG. 5 is a schematic diagram illustrating a static contact angle θL between a partition surface (film surface) and an ultraviolet curable resin ink for forming the lens.

Meanwhile, wettability of the surface of the obtained partition measured with the ink B1 was a contact angle 46°. As for a condition for measuring the contact angle, a pattern leaving an exposed portion of 5 mm width×30 mm length was formed at a peripheral portion of the photomask-1. Therefore, a contact angle measuring area was created on the same substrate simultaneously with the formation of the partition. The ink B1 of 0.5 μl was dropped on the contact angle measuring area by using an OCH200 manufactured by DATA PHYSICS CORPORATION, and a contact angle was measured after 1 second (at a measurement temperature of 23° C.). This contact angle was taken as the static contact angle of the partition surface (FIG. 5).

[Production of Lenticular Lens]

A 10-minute continuous ejection test on the ultraviolet curable resin ink (B1) was performed by using an inkjet head (KM512SH, specification: 4 pl) manufactured by Konica Minolta Holdings, Inc. at a driving frequency of 4.8 kHz and an applied voltage of 17.84 V. The ink did not cause any nozzle clogging and exhibited a satisfactory ejection characteristic.

Subsequently, by using the substrate I-2A-1, a lenticular lens sheet including a lenticular lens having a height of 28 μm was produced. At this time, the minimum necessary filling amount $V_0$ of the ultraviolet curable resin ink (B1) calculated from Equation (1) was 6.0 pl/μm. A head and a stage were set such that the ink can be filled between the partitions from 3 nozzles of KM512SH, and drawing was performed 11 times in a repeated manner between two partitions with a stage speed of 125 mm/sec and a dotting pitch of 18.5 μm (V=7.14 pl/μm filling). A state and a shape of the filled ink right after the drawing were measured by using an optical microscope and an optical interferometric profiler WYCO NT 1100 (manufactured by NIHON VEECO K.K.), respectively. The ink was filled uniformly without spreading beyond the partition, showing a good linear shape, and the surface profile also showed a smooth spherical surface (section (a) of FIG. 6). The width and the height of the filled ink measured by being projected from above the substrate were 289.2 μm and 32.9 μm, respectively (Table 2).

TABLE 2

| Processing condition | Example 1 | | Example 2 | | Example 3 | |
|---|---|---|---|---|---|---|
| | Width (μm) | Height (μm) | Width (μm) | Height (μm) | Width (μm) | Height (μm) |
| After applying ↓ | 298.2 | 32.9 | 292.3 | 32.5 | 280.5 | 33.2 |
| UV-LED exposure 4,900 mJ ↓ | 298.2 | 29.3 | 292.3 | 28.8 | 280.5 | 28.6 |
| One-shot exposure 1,000 mJ ↓ | 298.2 | 29.3 | 292.3 | 28.5 | 280.5 | 28.5 |
| Heat treatment 80° C. 3 minutes | 298.2 | 28.9 | 292.3 | 28.4 | 280.5 | 27.8 |
| Residual volume ratio (%) | | 88.0 | | 86.3 | | 82.2 |

Subsequently, on an inkjet stage, the substrate was exposed at 4,900 mJ/cm² with a UV-LED inline exposure machine (illuminance: 4,900 mW/cm², scanned at 1 mm/sec) and further exposed 1,000 mJ with a one-shot exposure machine (illuminance: 50 mJ/cm²). In addition, a heat treatment was performed at 80° C. for 3 minutes to obtain a lenticular lens. The dimensions in these processes are shown in Table 2, and optical microscope images before and after the heat treatment are shown in section (b) of FIG. 6. Even after the heat treatment, the surface profile showed a smooth spherical surface. When measured by being projected from above the substrate, the lens pitch w0 was maintained to be 320 μm by the partitions, and the width and the height of the filled lens were 298.2 μm and 28.9 μm, respectively (Table 2).

Example 2

Figure 6:
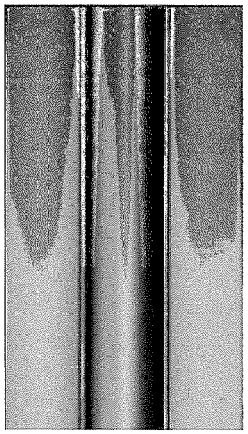
FIG. 6 shows images of planes of lenses obtained in examples.
Figure 7A:
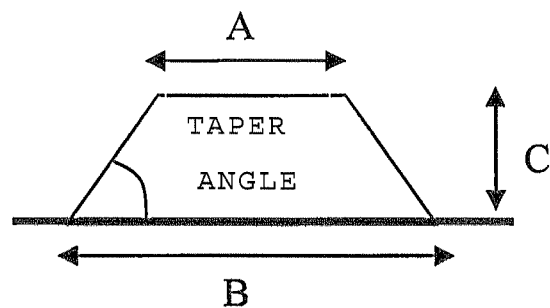
FIG. 7 are schematic diagrams illustrating the partition and the lens.
Figure 7B:
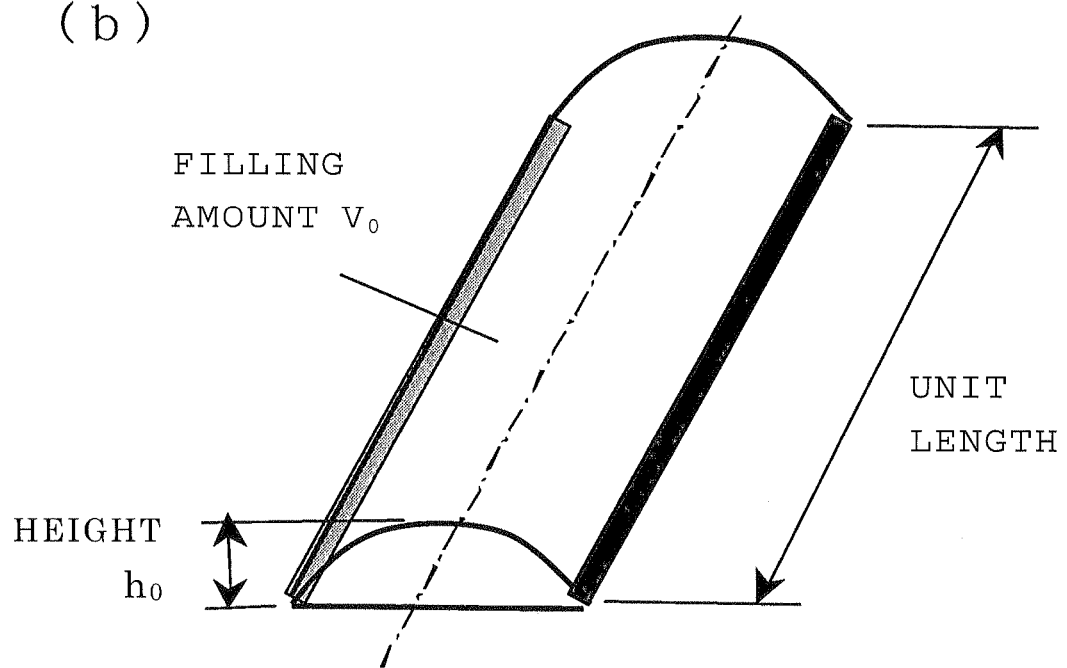

Example 2 was performed in the same manner as Example 1 except that a photomask-2 was used to form an exposed portion having a line pattern of a width of 30 μm and a length of 30 mm with a pitch of 320 μm and a transparent partition (I-2A-2) was formed by using this exposed portion. The results are shown in Tables 1 and 2. Even after the heat treatment, the linearity between the partition and the contact line was good, and the surface profile showed a smooth spherical surface (FIG. 6). In addition, when measured by being projected from above the substrate, the lens pitch w0 was maintained to be 320 μm by the partitions, and the width and the height of the filled lens were 292.3 μm and 28.4 μm, respectively (Table 2).

Example 3

Example 3 was performed in the same manner as Example 1 except that a photomask-3 was used to form an exposed portion having a line pattern of a width of 40 μm and a length of 30 mm with a pitch of 320 μm, a transparent partition (I-2A-3) was formed by using this exposed portion, and overlapping drawing was performed 11 times by an inkjet method with the ultraviolet curable resin A1. The results are shown in Tables 1 and 2. Even after the heat treatment, the linearity between the partition and the contact line was good, and the surface profile showed a smooth spherical surface (FIG. 6). In addition, when measured by being projected from above the substrate, the lens pitch w0 was maintained to be 320 μm by the partitions, and the width and the height of the filled lens were 280.5 μm and 27.8 μm, respectively.

Examples 4 to 6

Examples 4 to 6 were performed in the same manner as Example 1 except that the processing time at the final heat treatment temperature of 80° C. in Example 1 was set to 3 minutes, 15 minutes, and 30 minutes, respectively. The results showed that, even when the heat treatment time was extended, there was no change in the residual film ratio and the profile (Table 3).

TABLE 3

| Example | Processing time at 80° C. (minutes) | Height (μm) after filling | Height (μm) after processing at 80° C. | Residual volume ratio % |
|---|---|---|---|---|
| 4 | 3 | 32.3 | 27.7 | 85.6 |
| 5 | 15 | 32.7 | 27.9 | 85.2 |
| 6 | 30 | 32.2 | 27.6 | 85.6 |

Examples 7 to 10

Experiments were conducted in Examples 7 to 10 in the same manner as Example 1 except that the exposure condition was changed. The results showed that, even after the heat treatment, the linearity between the partition and the contact line was good, and the surface profile showed a smooth spherical surface in all the examples (Table 4).

TABLE 4

| Example | Height after applying μm | Exposing condition 1 (Inline) | Exposing condition 2 (One-shot exposure) | Height μm | Residual volume ratio % | Linearity | Profile |
|---|---|---|---|---|---|---|---|
| 7 | 33.3 | 1,600 mJ | — | 26.4 | 79.0 | ○ | ○ |
| 8 | 32.4 | 2,450 mJ | — | 27.7 | 85.6 | ○ | ○ |
| 9 | 32.4 | 4,900 mJ | — | 27.9 | 86.1 | ○ | ○ |
| 10 | 33.2 | 1,600 mJ | 1,000 mJ | 28.6 | 85.9 | ○ | ○ |
| 1 | 32.9 | 4,900 mJ | 1,000 mJ | 28.9 | 88.0 | ○ | ○ |

Examples 11 to 15

Examples 11 to 15 were performed in the same manner as Examples 1 and 6 to 9 except that the final heat treatment was performed at a temperature of 140° C. for 30 minutes (Example 11 corresponds to a modification example of Example 1. In the same manner, Example 12 corresponds to Example 6, Example 13 corresponds to Example 7, Example 14 corresponds to Example 8, and Example 15 corresponds to Example 9.) The results showed that, even after the heat treatment, the linearity between the partition and the contact line was good, and the surface profile showed a smooth spherical surface in all the examples (Table 5).

TABLE 5

| Example | Height after applying μm | Exposing condition 1 (Inline) | Exposing condition 2 (One-shot exposure) | Height μm | Residual volume ratio % | Linearity | Profile |
|---|---|---|---|---|---|---|---|
| 11 | 33.3 | 1,600 mJ | — | 23.3 | 70.0 | ○ | ○ |
| 12 | 32.4 | 2,450 mJ | — | 26.8 | 82.5 | ○ | ○ |
| 13 | 32.4 | 4,900 mJ | — | 26.9 | 82.9 | ○ | ○ |
| 14 | 33.2 | 1,600 mJ | 1,000 mJ | 27.9 | 83.8 | ○ | ○ |
| 15 | 32.9 | 4,900 mJ | 1,000 mJ | 28.1 | 85.3 | ○ | ○ |

Example 16

A transparent partition having a width of 20 μm was formed in the same manner as Example 1 except that the ink A1 was used. The transparent partition was then subjected to a treatment under an air stream of oxygen/argon by using an atmospheric-pressure plasma apparatus, and subsequently subjected to a fluorine gas plasma treatment, thereby creating a surface ink-repellent transparent partition substrate (I-A1-1) such that the contact angle became 50° with butyl carbitol acetate.

By using this substrate, a lenticular lens was produced in the same manner as Example 1. There was virtually no change in the width and the height of the lens from Example 1. Even after the heat treatment, the linearity between the partition and the contact line was good, and the surface profile showed a smooth spherical surface.

Examples 17 to 19 and Comparative Example 1

As shown in Table 6, a partition substrate having a different contact angle was created by changing a condition of atmospheric-pressure fluorine plasma. The ink B1 was filled with respect to a target lens size, and then exposed at 4,900 mJ/cm² with a UV-LED inline exposure machine (illuminance: 4,900 mW/cm², scanned at 1 mm/sec) on the inkjet stage, and further exposed at 1,000 mJ with a one-shot exposure machine (illuminance: 50 mJ/cm²). The heat treatment was performed at 80° C. for 3 minutes, thereby producing the lenticular lens. As shown in Examples, the target height was obtained, and even after the heat treatment, the linearity between the partition and the contact line was good and the surface profile showed a smooth spherical surface.

On the other hand, in Comparative Example 1, formation of a lens was tried with a transparent partition substrate on which the fluorine plasma treatment was not performed, and the results showed that the ultraviolet curable resin ink was overlapped on an upper side portion of the partition and the ultraviolet curable resin ink was even overflowed the partition portion.

Comparative Example 2

A surface ink-repellent transparent partition substrate was created in the same manner as Example 3 by using a negative photomask with the target lens pitch ($w_0$) set to 135 μm to form a partition having a width of 40 μm. A partition size at this time was A=35.5 μm, B=41.0 μm, and C=1.4 μm. The ultraviolet curable resin ink B1 was filled in this partition substrate, exposure at 4,900 mJ and annealing at 80° C. for 30 minutes were performed, thereby producing a lenticular lens sheet having a height of 4.82 μm.

The lenticular lens sheets obtained in Example 19 and Comparative Example 2 were bonded on a 6-inch liquid crystal panel, and display of a three-dimensional image was performed while the two lenticular lens sheets were compared. A clear three-dimensional image could be recognized in the former case, while the three-dimensional image was not clear in the latter case.

Comparative Example 3

A surface ink-repellent transparent partition substrate was created in the same manner as Example 1 by using a negative photomask with the target lens pitch ($w_0$) set to 135 μm to form a partition having a width of 20 μm and a thickness of 3 μm. The obtained partition size was A=17.5 μm, B=23.0 μm, and C=3.0 μm. The ultraviolet curable resin ink B1 was filled in this partition substrate, exposure at 4,900 mJ and annealing at 80° C. for 30 minutes were performed, thereby producing a lenticular lens having a height of 4.82 μm.

The lenticular lens sheets obtained in Example 19 and Comparative Example 3 were bonded on a 6-inch liquid crys-

TABLE 6

| Example | Target lens size | | | Partition size | | | | Contact angle | Height of formed lens | | Evaluation | |
|---|---|---|---|---|---|---|---|---|---|---|---|---|
| | w0 μm | h0 μm | θ0 degree | w μm | A μm | B μm | C μm | θL degree | h After filling | h After curing | Profile | Residual volume ratio |
| Example 17 | 320 | 27.8 | 19.7 | 320 | 18.0 | 22.0 | 2.0 | 46 | 32.7 | 27.8 | ○ | 85.0% |
| Comparative Example 1 | 320 | 27.8 | 19.7 | 320 | 18.0 | 22.0 | 2.0 | 24 | 16.0 | — | x overflowed | — |
| Example 18 | 320 | 16.8 | 12.0 | 320 | 18.0 | 22.0 | 2.0 | 37 | 19.3 | 16.8 | ○ | 86.0% |
| Example 19 | 135 | 4.81 | 8.16 | 135 | 16.8 | 20.5 | 1.4 | 37 | 5.62 | 4.82 | ○ | 86.1% | tal panel, and display of a three-dimensional image was performed while the two lenticular lens sheets were compared. A clear three-dimensional image could be recognized in the former case, while optical unevenness was observed on the screen surface in the latter case.

REFERENCE SIGNS LIST

1: support substrate
2: lenticular lens
3: partition

The invention claimed is:

1. A lenticular lens sheet, comprising:
a support substrate;
a plurality of lenticular lenses on the support substrate; and
a partition between adjacent ones of the plurality of lenticular lenses,
wherein the lenticular lens sheet is obtained by supplying a transparent resin composition ink by an inkjet method to an area partitioned by the partition and subsequently curing the transparent resin composition ink with ultraviolet rays,
wherein a cross section of the partition cut in a direction perpendicular to the plurality of lenticular lenses has a taper angle of 90° or smaller with respect to the support substrate; and
the following condition is satisfied:

$$A \leq B \quad \text{(i)}$$

$$A \leq w_0/8 \quad \text{(ii)}$$

$$C < h_0/3 \quad \text{(iii)}$$

where A is upper base of the partition cross section, B is lower base of the partition cross section, C is height of the partition, $w_0$ is pitch of the lenticular lenses, and $h_0$ is height of the lenticular lenses.

2. A lenticular lens sheet according to claim 1, wherein the transparent resin composition ink forming the plurality of lenticular lenses includes an ultraviolet curable resin composition ink containing an ultraviolet curable component of 90 wt % or more and has a residual volume ratio of 70 vol % or more after a heat treatment at a temperature of 80° C. to 140° C.

3. An optical element, comprising the lenticular lens sheet according to claim 2.

4. A stereoscopic display, comprising the lenticular sheet according to claim 2.

5. An optical element, comprising, the lenticular lens sheet according to claim 1.

6. A stereoscopic display, comprising the lenticular lens sheet according to claim 1.

7. A method of manufacturing a lenticular lens sheet comprising a support substrate: a plurality of lenticular lenses on the support substrate; and a partition between adjacent ones of the plurality of lenticular lenses, wherein the lenticular lens sheet is obtained by supplying a transparent resin composition ink by an inkjet method to an area partitioned by the partition and subsequently curing the transparent resin composition ink with ultraviolet rays, the method comprising:
with respect to a pitch $w_0$ and a height $h_0$ of a target lenticular lens and an angle $\theta_0$ of the lenticular lens with respect to the support substrate,
(1) forming the partition including a surface having ink-repellency with the same pitch as the pitch $w_0$ of the target lenticular lenses;

(2) applying, by an inkjet method, the transparent resin composition ink curable by ultraviolet rays with an amount V (pl/µm) exceeding a volume $V_0$ (pl/µm) required to form the lenticular lenses or with a height h exceeding the target height $h_0$ with respect to the area partitioned by the partition ($V_0$ is calculated from a volume of the target lenticular lens as follows, where r is curvature radius of the lens cross section)

$$\theta_0 = 2 \times \tan^{-1}\left[\frac{h_0}{\left(\frac{w_0}{2}\right)}\right] \quad \text{(Equation 1)}$$

$$h(r) = \sqrt{\frac{\left(\frac{w_0}{2}\right)^2}{\sin^2\theta_0} - r^2} - \frac{\frac{w_0}{2}}{\tan\theta_0}$$

$$V_0 = \int_{-\frac{w_0}{2}}^{\frac{w_0}{2}} h(r)dr \quad (pl/\mu m);$$

(3) curing, the transparent resin composition ink by using the ultraviolet rays; and
(4) obtaining the target height $h_0$ by performing a heat treatment at a temperature of 80° C. to 140° C.

8. A method of manufacturing a lenticular lens sheet according to claim 7, wherein a static contact angle $\theta_L$ of the transparent resin composition ink forming the lenticular lenses with respect to a surface of the partition exceeds $\theta_0$ represented by (Equation 1).

9. A method of manufacturing a lenticular lens sheet according to claim 7, wherein a cross section of the partition cut in a direction perpendicular to the plurality of lenticular lenses has a taper angle of 90° or smaller with respect to the support substrate; and the following condition is satisfied:

$$A \leq B \quad \text{(i)}$$

$$A \leq w_0/8 \quad \text{(ii)}$$

$$C < h_0/3 \quad \text{(iii)}$$

where A is upper base of the partition cross section, B is lower base of the partition cross section, C is height of the partition, $w_0$ is pitch of the lenticular lenses, and $h_0$ is height of the lenticular lenses.

10. A method of manufacturing a lenticular lens sheet according to claim 9, wherein a static contact angle $\theta_L$ of the transparent resin composition ink forming the lenticular lenses with respect to a surface of the partition exceeds $\theta_0$ represented by (Equation 1).

11. A method of manufacturing a lenticular lens sheet according to claim 7, wherein the transparent resin composition ink forming the plurality of lenticular lenses includes an ultraviolet curable resin composition ink containing an ultraviolet curable component of 90 wt % or more and has a residual volume ratio of 70 vol % or more after a heat treatment at a temperature of 80° C. to 140° C.

12. A method of manufacturing a lenticular lens sheet according to claim 11, wherein a static contact angle $\theta_L$ of the transparent resin composition ink forming the lenticular lenses with respect to a surface of the partition exceeds $\theta_0$ represented by (Equation 1).

* * * * *